(12) United States Patent
Onogi et al.

(10) Patent No.: US 7,889,303 B2
(45) Date of Patent: Feb. 15, 2011

(54) LIQUID CRYSTAL DISPLAY DEVICE

(75) Inventors: Tomohide Onogi, Gifu-ken (JP); Yasuo Segawa, Gifu-ken (JP)

(73) Assignee: Sony Corporation, Tokyo (JP)

( * ) Notice: Subject to any disclaimer, the term of this patent is extended or adjusted under 35 U.S.C. 154(b) by 950 days.

(21) Appl. No.: 11/727,146

(22) Filed: Mar. 23, 2007

(65) Prior Publication Data
US 2007/0222907 A1  Sep. 27, 2007

(30) Foreign Application Priority Data
Mar. 27, 2006  (JP) ............................ 2006-085953

(51) Int. Cl.
*G02F 1/1343* (2006.01)
*G02F 1/136* (2006.01)

(52) U.S. Cl. ..................... 349/141; 349/42; 349/144; 349/145

(58) Field of Classification Search ............... 349/42, 349/141–145
See application file for complete search history.

(56) References Cited

U.S. PATENT DOCUMENTS 6,580,487 B1 *  6/2003  Kim et al. .................. 349/141
7,084,942 B2 *  8/2006  Luo .......................... 349/114
7,723,727 B2 *  5/2010  Song ......................... 349/145
2001/0048500 A1 * 12/2001  Lim et al. ................... 349/141

FOREIGN PATENT DOCUMENTS

JP          2002-296611 A     10/2002

* cited by examiner

*Primary Examiner*—Julie-Huyen L Ngo
(74) *Attorney, Agent, or Firm*—K&L Gates LLP

(57) ABSTRACT

In a liquid crystal display device according to a FFS method, a line inversion drive with suppressed crosstalk due to a signal distortion is made available. Pixels A are disposed in sequence in a left to right direction in a first row, while pixels B are disposed in sequence in the left to right direction in a second row that is below the first row. In the pixel A, a pixel electrode is formed of the first layer transparent electrode and connected with a thin film transistor through a contact hole. In the pixel B, a common electrode is formed of the first layer transparent electrode and connected with a common electric potential line through a contact hole. Also in the pixel A, a common electrode having a plurality of slits is formed of the second layer transparent electrode and connected with the common electric potential line through a contact hole. In the pixel B, a pixel electrode having a plurality of slits is formed of the second layer transparent electrode and connected with a thin film transistor through a contact hole.

6 Claims, 15 Drawing Sheets

FIG.5A
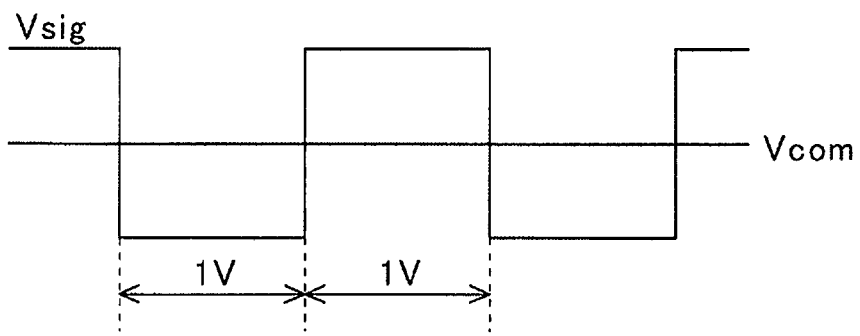
FIG.5B
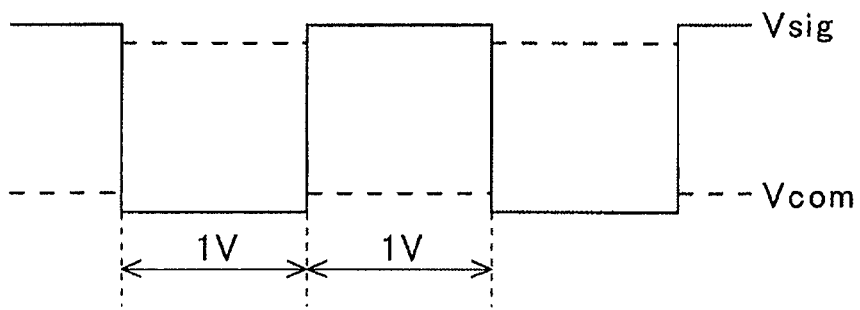
FIG.6
| + | + | + | + | ... |
|---|---|---|---|---|
| − | − | − | − | ... |
| + | + | + | + | ... |
| − | − | − | − | ... |
⋮ ⋮ ⋮ ⋮

FIG.12

DOT INVERSION DRIVE

| + | − | + | − | · · · |
|---|---|---|---|---|
| − | + | − | + | · · · |
| + | − | + | − | · · · |
| − | + | − | + | · · · |

| A | B | A | B | · · · |
|---|---|---|---|---|
| B | A | B | A | · · · |
| A | B | A | B | · · · |
| B | A | B | A | · · · |

· · · ·

LIQUID CRYSTAL DISPLAY DEVICE

CROSS-REFERENCE OF THE INVENTION

This application claims priority from Japanese Patent Application No. 2006-085953, the content of which is incorporated herein by reference in its entirety.

BACKGROUND OF THE INVENTION

1. Field of the Invention

This invention relates to a liquid crystal display device, specifically to a liquid crystal display device in which an alignment direction of liquid crystal molecules is controlled by a lateral electric field generated between a pixel electrode and a common electrode.

2. Description of the Related Art

As one way of achieving a wide viewing angle of the liquid crystal display device, a method to realize a light switching function by rotating the liquid crystal molecules in a plane parallel to the substrate with the lateral electric field generated between the electrodes on the same substrate has been developed. In-Plane Switching (hereafter referred to as IPS) method and Fringe-Field Switching (hereafter referred to as FFS) method are known as examples of technologies mentioned above.

A manufacturing process of the liquid crystal display device according to the FFS method will be explained referring to the drawings. FIGS. 17A through 19B show a manufacturing process of one pixel in the liquid crystal display device according to the FFS method. FIGS. 17A, 18A and 19A are plan views. Each of FIGS. 17B, 18B and 19B is a cross-sectional view showing a section X-X in each of the FIGS. 17A, 18A and 19A, respectively. Although a plurality of pixels is disposed in a matrix form in the actual liquid crystal display device, only one pixel is shown in each of the drawings.

A buffer layer 11, which is made of a silicon dioxide ($SiO_2$) film or a silicon nitride (SiNx) film, and an amorphous silicon layer are successively formed by CVD (Chemical Vapor Deposition) on a TFT substrate 10, which is made of a glass substrate or the like, as shown in FIG. 17B. The amorphous silicon layer is crystallized by excimer laser annealing and transformed into a polysilicon layer. The polysilicon layer is patterned to form a U-shaped active layer 12 of a thin film transistor 1.

After that, a gate insulation film 13 is formed over the active layer 12. A gate line 14 made of chromium, molybdenum or the like is formed on the gate insulation film 13 overlapping the active layer 12. The gate line 14 extends in a row direction, and intersects the active layer 12 at two locations. A gate signal that controls turning on/off of the thin film transistor 1 is applied to the gate line 14. On the other hand, a common electric potential line 15, that is made of the same material as the gate line 14 and is for providing a common electric potential Vcom, is formed parallel to the gate line 14.

Next, there is formed an interlayer insulation film 16 that covers the thin film transistor 1 and the common electric potential line 15. And contact holes CH1 and CH2, that expose a source region 12s and a drain region 12d in the active layer 12 respectively, are formed in the interlayer insulation film 16. Also, a contact hole CH3, that exposes the common electric potential line 15, is formed in the interlayer insulation film 16.

There are formed a source electrode 17 that is connected with the source region 12s through the contact hole CH1, a display signal line 18 that is connected with the drain region 12d through the contact hole CH2, and an electrode 19 that is connected with the common electric potential line 15 through the contact hole CH3. The source electrode 17, the display signal line 18 and the electrode 19 are made of a metal such as aluminum, an aluminum alloy or the like. Next, a planarization film 20 is formed over the entire surface. Contact holes CH4 and CH5, that expose the source electrode 17 and the electrode 19 respectively, are formed in the planarization film 20.

And there is formed a pixel electrode 21 that is connected with the source electrode 17 through the contact hole CH4 and extends over the planarization film 20, as shown in FIG. 18B. The pixel electrode 21 is made of a first layer transparent electrode such as ITO (Indium Tin Oxide), and is applied a display signal Vsig from the display signal line 18 through the thin film transistor 1.

After that, an insulation film 22 is formed to cover the pixel electrode 21, as shown in FIG. 19B. A contact hole CH6, that exposes the electrode 19, is formed by etching the insulation film 22. A common electrode 23, that has a plurality of slits S, is formed on the pixel electrode 21 through the insulation film 22. The common electrode 23 is made of a second layer transparent electrode such as ITO, and is connected with the electrode 19 through the contact hole CH6.

A counter substrate 30 made of a glass substrate or the like is disposed facing the TFT substrate 10. A polarizing plate 31 is attached to the counter substrate 30. Also, a polarizing plate 32 is attached to a back surface of the TFT substrate 10. The polarizing plates 31 and 32 are disposed in a way that their polarization axes are perpendicular to each other. A liquid crystal 40 is sealed-in between the TFT substrate 10 and the counter substrate 30.

In the liquid crystal display device described above, an average alignment direction (hereafter simply referred to as "alignment direction") of major axes of the liquid crystal molecules of the liquid crystal 40 is perpendicular to the polarization axis of the polarizing plate 32 when a display voltage is not applied to the pixel electrode 21 (no voltage state). In this case, linearly polarized light passing through the liquid crystal 40 does not go through the polarizing plate 31 because its polarization axis is perpendicular to the polarization axis of the polarizing plate 31. That is, black is displayed (normally black).

When the display voltage is applied to the pixel electrode 21, on the other hand, there is caused an electric field from the pixel electrode 21 toward the underlying common electrode 23 through the slits S. The electric field is perpendicular to a longitudinal direction of the slits S on the plan view, and the liquid crystal molecules are aligned parallel to or perpendicular to a line of electric force of the electric field. At that time, the linearly polarized incident light to the liquid crystal 40 is turned into elliptically polarized light by birefringence to have a component of linearly polarized light that passes through the polarizing plate 31. In this case, white is displayed. The liquid crystal display device according to the FFS method is disclosed in Japanese Patent Application Publication No. 2002-296611.

In the liquid crystal display device, a voltage applied to the liquid crystal is inverted once every frame period by inverting a polarity relative to the common electric potential Vcom of the display signal Vsig applied to the display signal line 18 in order to prevent deterioration of the liquid crystal. However, with a frame inversion drive, which is a method to invert all of an image area at a time, quality of the display is worsened by a flicker or the like. Thus, a line inversion drive in which the inversion of the polarity is performed by each horizontal line, and a dot inversion drive in which the inversion of the polarity is performed by each dot have been known as effective methods to suppress the flicker. In addition, a common electrode AC drive, which is a method to provide the common electrode with alternating voltage, is known as a method effective to reduce a voltage to drive a driver IC and a circuit incorporating the TFTs.

When the line inversion drive and the common electrode AC drive are combined together in a conventional liquid crystal display device, there has been a problem that unevenness in brightness due to a signal distortion is apt to be caused to reduce the quality of the display, because the voltage at the common electrode is inverted every horizontal period.

In addition, reducing the drive voltage has been difficult because it is not possible to combine the dot inversion drive with the common electrode AC drive in the conventional liquid crystal display device. Furthermore, because the dot inversion drive requires a circuit to dot-invert the polarity of the display signal Vsig, there has been a problem that a structure of a peripheral circuit of the pixel becomes more complicated as well as increased power consumption due to the inversion drive.

SUMMARY OF THE INVENTION

This invention is directed to solving the problems described above by contriving a layout of pixels, taking advantage of the liquid crystal device according to the FFS method that a pixel electrode and a common electrode are disposed on the same substrate through an insulation film.

A liquid crystal display device according to an embodiment of this invention includes a plurality of first pixels and a plurality of second pixels disposed on a first substrate. The first pixel includes a first pixel electrode and a first common electrode that has a plurality of first slits and is disposed on the first pixel electrode through an insulation film. The second pixel includes a second common electrode and a second pixel electrode that has a plurality of second slits and is disposed on the second common electrode through an insulation film. The first pixels are disposed in sequence in a first row of a pixel region. The second pixels are disposed in sequence in a second row of the pixel region that is adjacent the first row. A liquid crystal is sealed-in between the first substrate and a second substrate that faces the first substrate.

As a result, a line inversion drive is performed in the pixel region by performing only a frame inversion drive in a peripheral circuit-side, because vertical position of the pixel electrode relative to that of the common electrode alternates row by row. With this, the unevenness in the brightness due to the signal distortion is suppressed compared with the conventional case where the line inversion drive and the common electrode AC drive are combined.

A liquid crystal display device according to another embodiment of this invention includes a plurality of first pixels and a plurality of second pixels disposed on a first substrate. The first pixel includes a first pixel electrode and a first common electrode that has a plurality of first slits and is disposed on the first pixel electrode through an insulation film. The second pixel includes a second common electrode and a second pixel electrode that has a plurality of second slits and is disposed on the second common electrode through an insulation film. The first pixels are disposed in sequence in a first column of a pixel region. The second pixels are disposed in sequence in a second column of the pixel region that is adjacent the first column. A liquid crystal is sealed-in between the first substrate and a second substrate that faces the first substrate. As a result, a dot inversion drive is performed in the pixel region by performing only a common electrode AC drive and the line inversion drive in a peripheral circuit-side, because vertical position of the pixel electrode relative to that of the common electrode alternates column by column.

A liquid crystal display device according to another embodiment of this invention includes a plurality of first pixels and a plurality of second pixels. The first pixel includes a first pixel electrode and a first common electrode that has a plurality of first slits and is disposed on the first pixel electrode through an insulation film. The second pixel includes a second common electrode and a second pixel electrode that has a plurality of second slits and is disposed on the second common electrode through the insulation film. The first pixel and the second pixel are disposed alternately in a first row of a pixel region. The first pixel and the second pixel are disposed alternately in an opposite order in a second row of the pixel region that is adjacent the first row. A liquid crystal is sealed-in between the first substrate and a second substrate that faces the first substrate.

With this, a vertical position of the pixel electrode relative to that of the common electrode alternates row by row as well as column by column. As a result, the dot inversion drive is performed in the pixel region by performing only the frame inversion drive in a peripheral circuit-side, producing an effect to further reduce power consumption.

BRIEF DESCRIPTION OF THE DRAWINGS

FIGS. 5A and 5B are for explanation of an inversion drive of a display signal Vsig according to the first embodiment of this invention.

FIG. 6 is for explanation of a line inversion drive.

FIG. 12 is for explanation of a dot inversion drive.

FIG. 13 shows a layout of a whole pixel region in a liquid crystal display device according to a fourth embodiment of this invention.

DETAILED DESCRIPTION OF THE INVENTION

Figure 1:
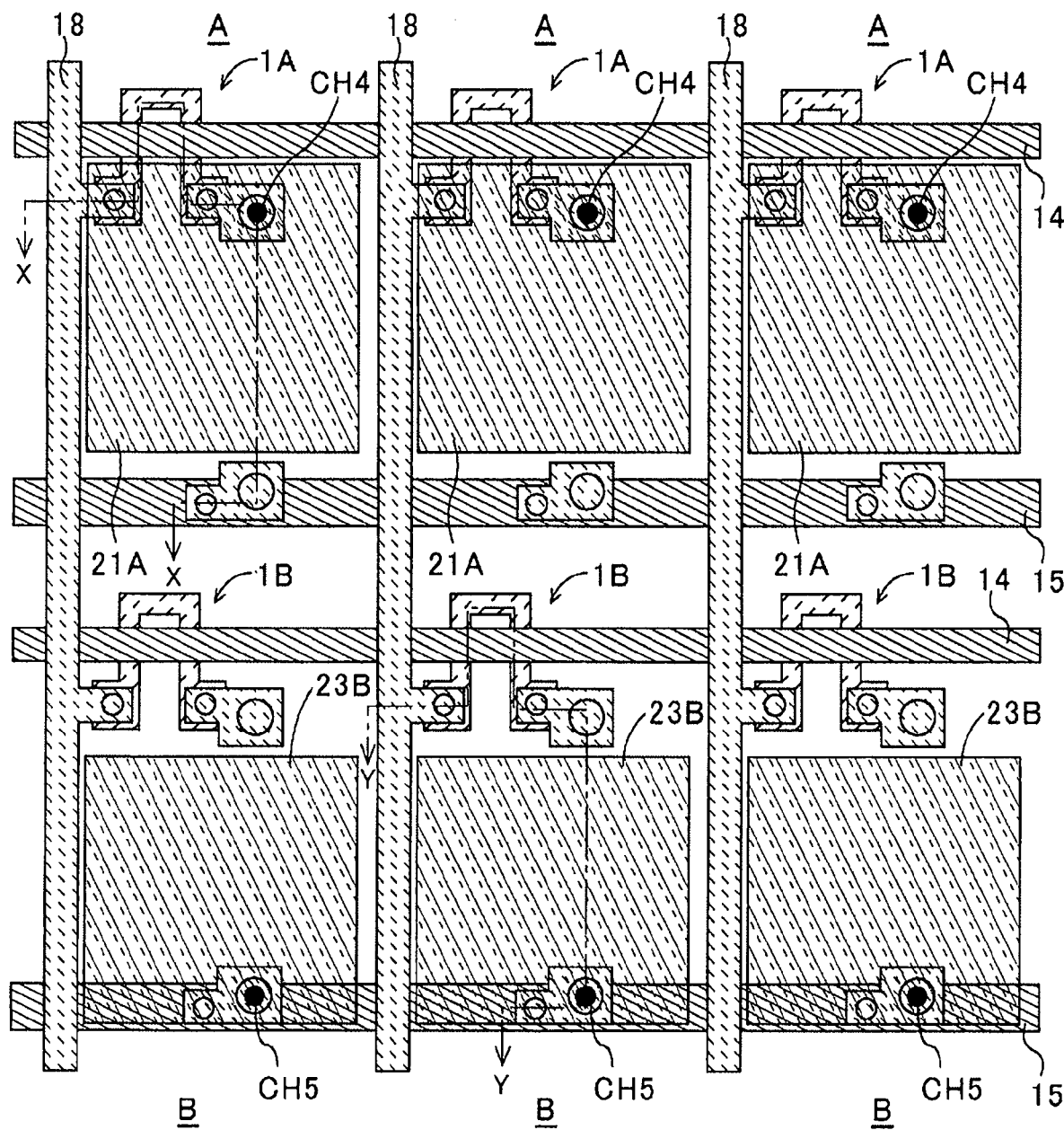
FIG. 1 shows a layout of pixels in a liquid crystal display device according to a first embodiment of this invention.
Figure 2:
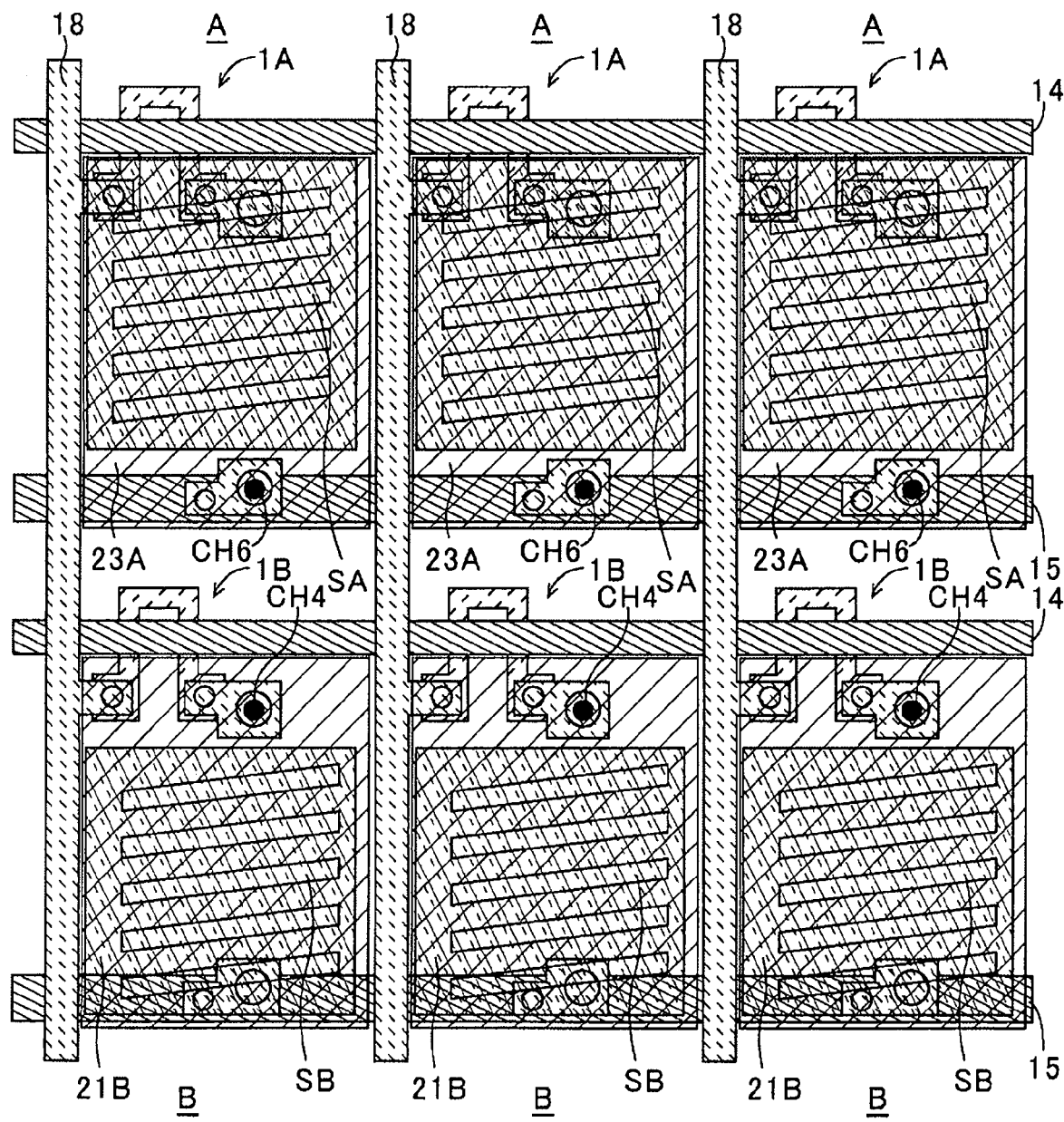
FIG. 2 shows a layout of pixels in the liquid crystal display device according to the first embodiment of this invention.

A liquid crystal display device according to a first embodiment of this invention will be explained hereinafter referring to the drawings. FIG. 1 and FIG. 2 are layouts of pixels in the liquid crystal display device. FIG. 1 shows a layout of a first layer transparent electrode, while FIG. 2 shows, in addition to the layout of the first layer transparent electrode, a layout of a second layer transparent electrode disposed on the first layer transparent electrode through an insulation film.

Pixels A are disposed in sequence in a left to right direction in a first row of a pixel region, while pixels B are disposed in sequence in the left to right direction in a second row of the pixel region that is below the first row, as shown in FIG. 1. In the pixel A, a pixel electrode 21A is formed of the first layer transparent electrode and connected with a thin film transistor 1A through a contact hole CH4. In the pixel B, a common electrode 23B is formed of the first layer transparent electrode and connected with a common electric potential line 15 through a contact hole CH5.

Also in the pixel A, a common electrode 23A having a plurality of slits SA is formed of the second layer transparent electrode and connected with the common electric potential line 15 through a contact hole CH6, as shown in FIG. 2. In the pixel B, a pixel electrode 21B having a plurality of slits SB is formed of the second layer transparent electrode and connected with a thin film transistor 1B through a contact hole CH4.

Figures 3, 4:
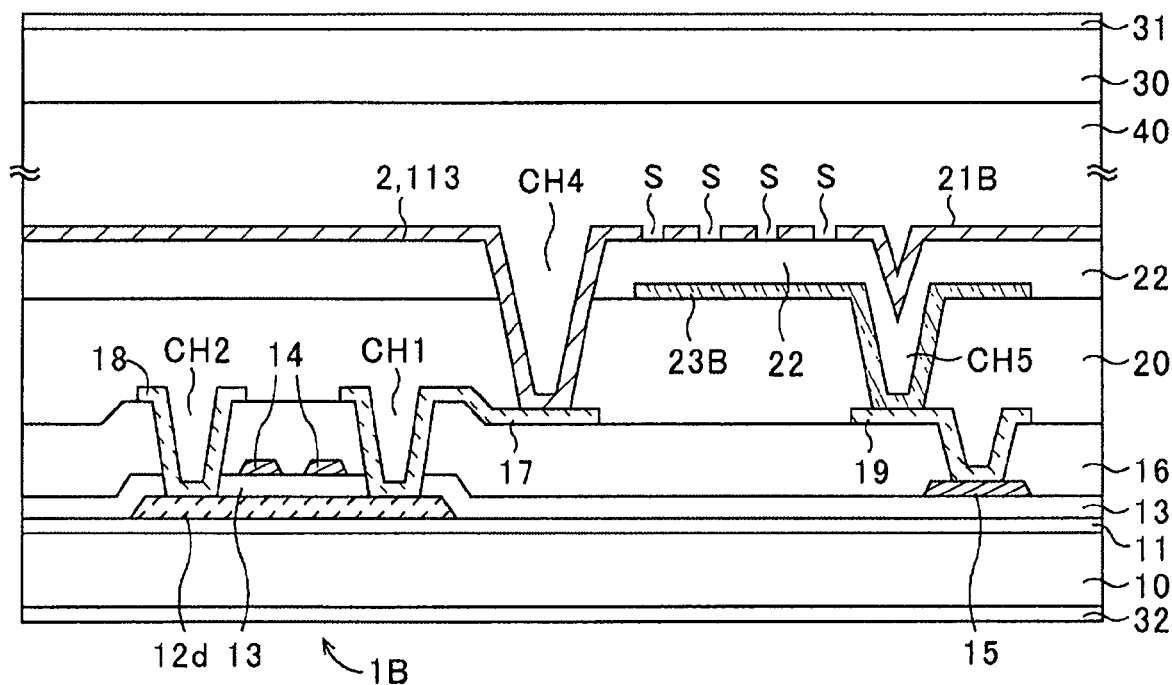
FIG. 3 is a cross-sectional view showing a section Y-Y in FIG. 1.
FIG. 4 shows a layout of a whole pixel region in the liquid crystal display device according to the first embodiment of this invention.
Figure 19A:
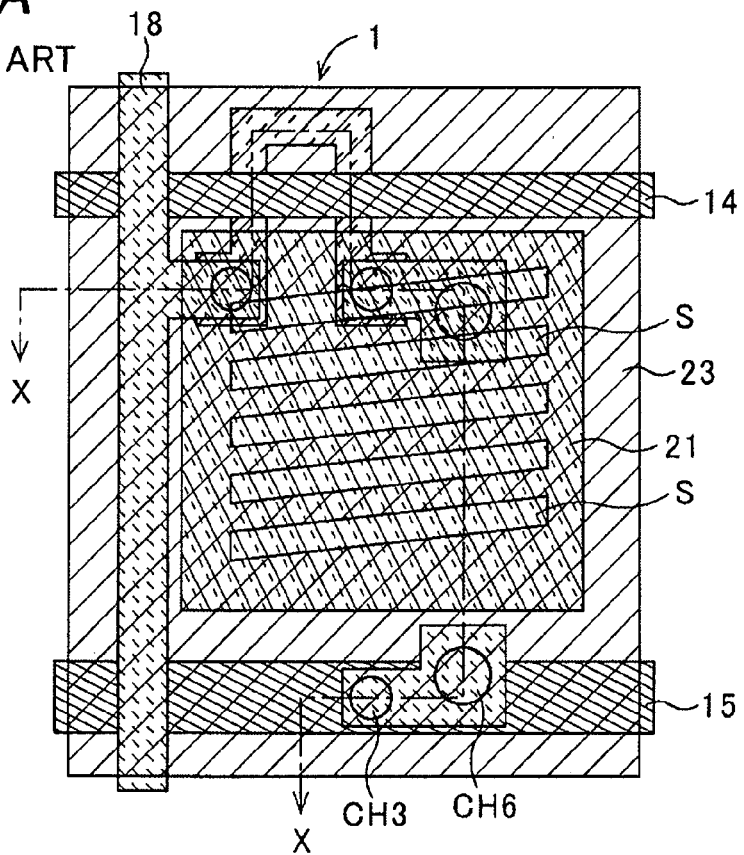
FIGS. 19A and 19B are for explanation of the structure and the manufacturing method of the liquid crystal display device according to the conventional art.
Figure 19B:
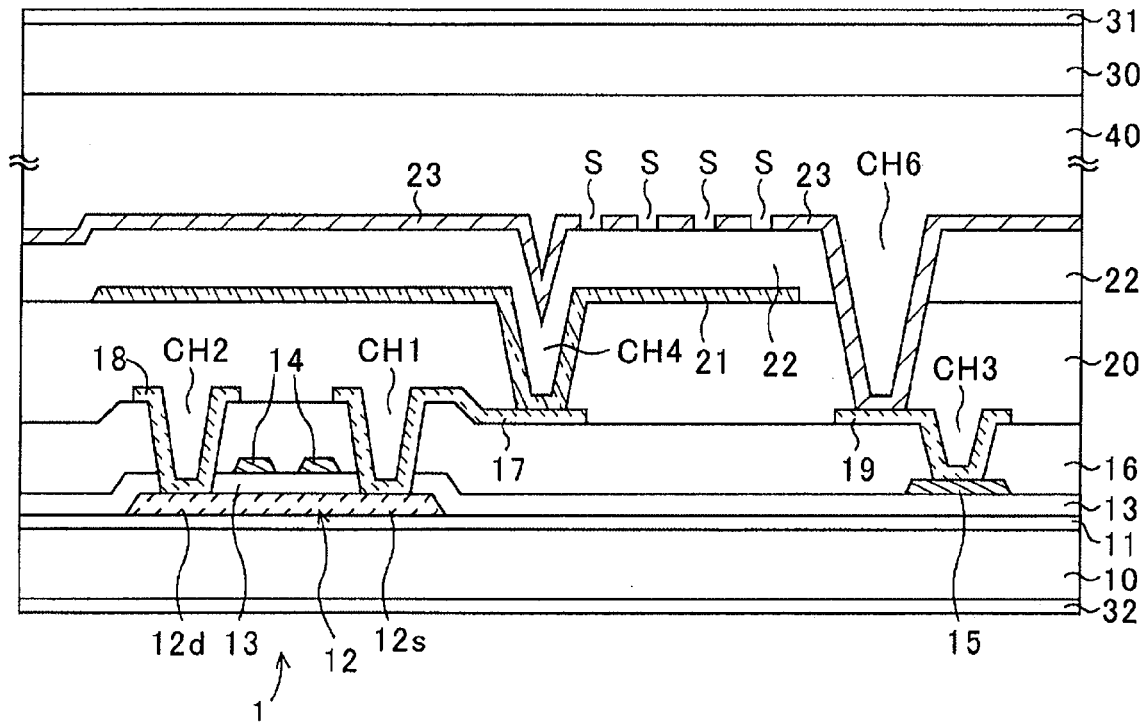

The pixel A is the same as the pixel of the conventional art shown in FIG. 19, that is, the thin film transistor 1A, the pixel electrode 21A and the common electrode 23A shown in FIG. 1 are the same as the thin film transistor 1, the pixel electrode 21 and the common electrode 23 shown in FIG. 19, respectively. In the pixel B, contrary to the pixel A, the common electrode 23B is formed of the first layer transparent electrode and the pixel electrode 21B is formed of the second layer transparent electrode above the first layer transparent electrode, as shown in FIG. 3, which is a cross-sectional view of the device along line Y-Y of FIG. 1. An insulation film 22 is formed between the common electrode 23B and the pixel electrode 21B. The other components in the pixel B are the same as those in the pixel A. With the structure described above, a vertical position of the pixel electrode relative to that of the common electrode in the pixel A is reversed in the pixel B.

FIG. 4 is a layout showing the whole pixel region in the liquid crystal display device. The pixels A are disposed in sequence in the left to right direction in odd-numbered rows of the pixel region, while the pixels B are disposed in sequence in the left to right direction in even-numbered rows of the pixel region. An operation in the case where a display signal Vsig of the frame inversion drive as shown in FIG. 5A is applied to the liquid crystal display device of the layout described above will be explained. A polarity of the display signal Vsig relative to a common electric potential Vcom is inverted every vertical period (1V), as shown in FIG. 5A. When a gate signal on a first line (first row) of gate lines 14 in FIG. 4 turns to a high level, the transistor 1A in the pixel A is turned on (that is, the thin film transistors 1A and 1B are of N-channel type).

Then, in the pixel A, when the display signal Vsig of positive polarity is applied to the pixel electrode 21A through the thin film transistor 1A, the pixel electrode 21A of the lower layer becomes higher in the electric potential than the common electrode 23A of the upper layer. After a horizontal scanning on the first line is performed over one horizontal period (1H), a gate signal on a second line (second row) of the gate lines 14 turns to the high level to turned on the transistor 1B in the pixel B.

Then, in the pixel B, when the display signal Vsig of positive polarity is applied to the pixel electrode 21B through the thin film transistor 1B, the pixel electrode 21B of the upper layer becomes higher in the electric potential than the common electrode 23B of the lower layer. Usually in a liquid crystal display using low temperature polysilicon TFTs, the display signal Vsig is applied after the gate line 14 turns to the high level to turn the TFT on. On the other hand, in a liquid crystal display using amorphous silicon TFTs, that will be described later, the gate line 14 turns to the high level after the display signal Vsig is applied.

As describe above, the relationship between the electric potential at the pixel electrode and the electric potential at the common electrode in the pixel A is reversed in the pixel B, resulting in performing the line inversion drive. Symbols + and − shown in FIG. 6 denote a positive polarity (+) and a negative polarity (−) of the electric field applied to the liquid crystal, respectively. The positive polarity (+) and the negative polarity (−) of the electric field applied to the liquid crystal shown in FIG. 6 are reversed in a next frame, since the polarity of the display signal Vsig relative to the common electric potential Vcom is reversed in the next frame.

According to the liquid crystal display device described above, the line inversion drive is performed in the pixel region by performing only the frame inversion drive. With this, the worsening in the quality of the display due to the signal distortion decreases. In addition, the power consumption in the peripheral circuit can be reduced because a frequency of the signal applied to the common electrode is reduced compared with the conventional line drive.

Figure 7:
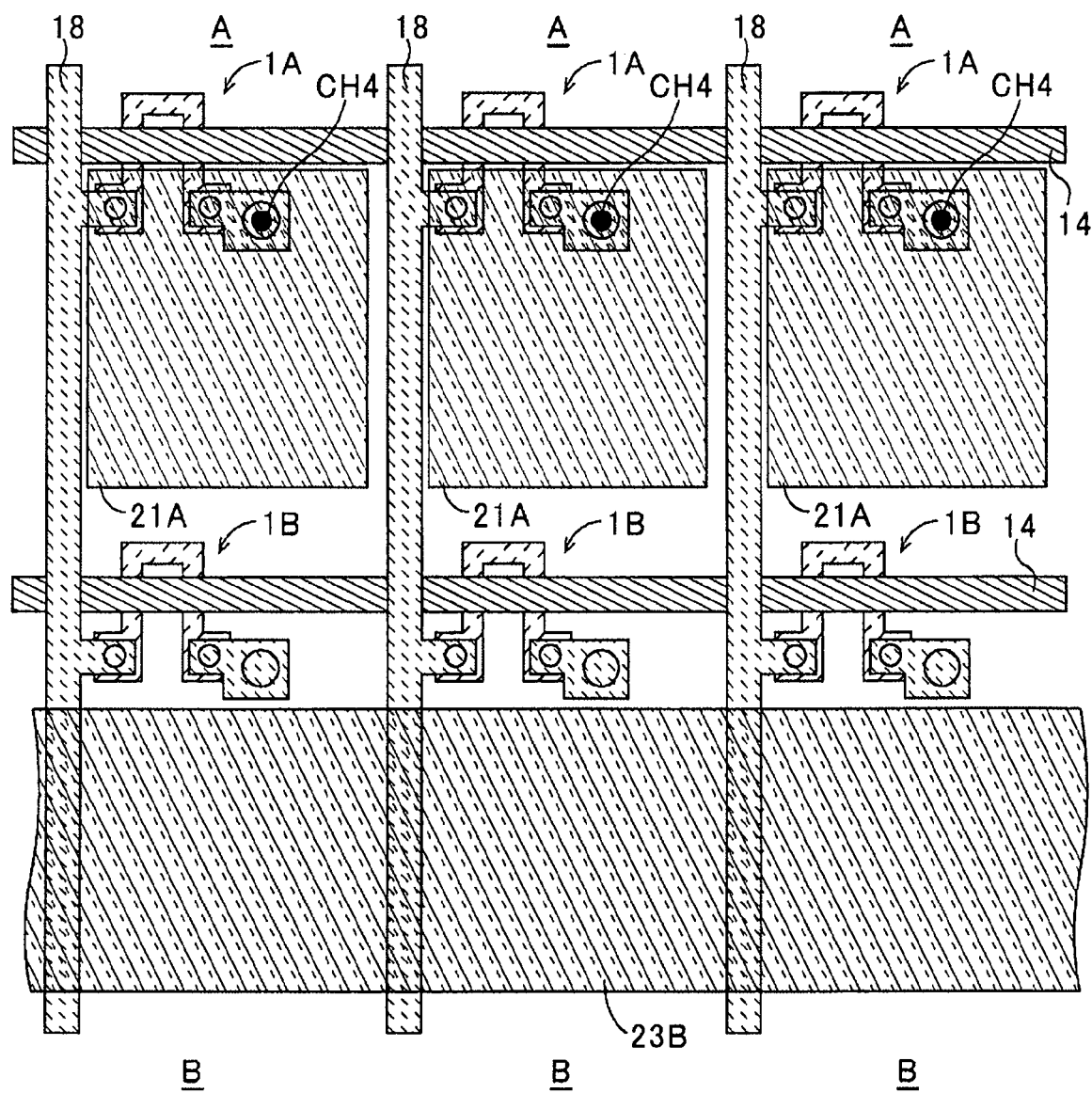
FIG. 7 shows a layout of pixels in a liquid crystal display device according to a second embodiment of this invention.

Next, a liquid crystal display device according to a second embodiment of this invention will be explained referring to the drawings. This embodiment removes the need for the common electric potential line 15 that is required in the first embodiment. While the pixel electrodes 21A made of the first layer transparent electrode are separated pixel by pixel and each of them is connected to the thin film transistor 1A in the first row, the common electrode 23B made of the first layer transparent electrode is not separated pixel by pixel and made into a single piece in the second row that is bellow the first row, as shown in FIG. 7. And the common electric potential Vcom is supplied to the single piece common electrode 23B outside of the pixel region.

Figure 8:
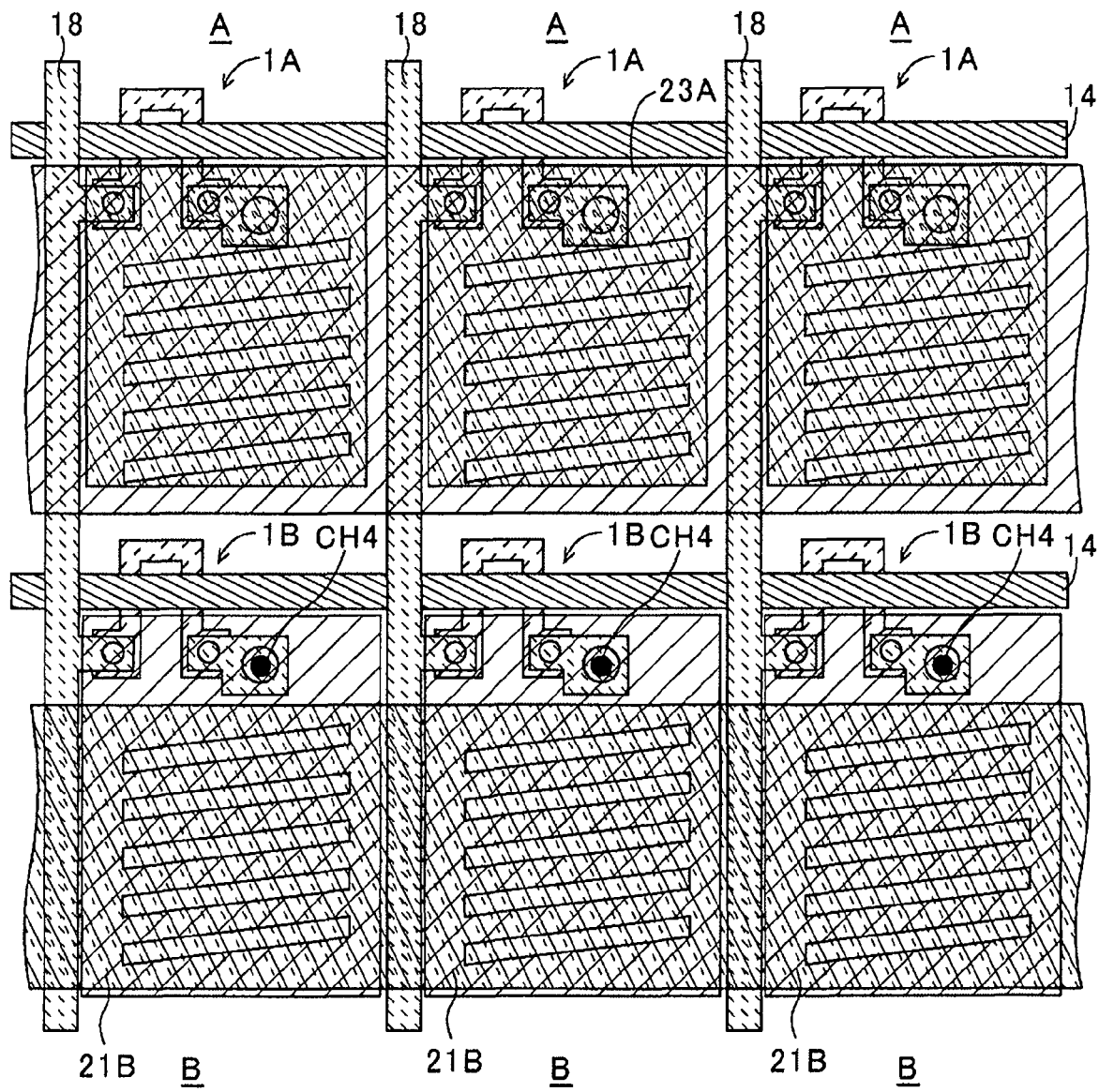
FIG. 8 shows a layout of pixels in the liquid crystal display device according to the second embodiment of this invention.

Also, the common electrode 23A made of the second layer transparent electrode is not separated pixel by pixel and made into a single piece in the first row, as shown in FIG. 8. And the common electrode 23A is provided with the common electric potential Vcom outside of the pixel region as the common electrode 23B. The pixel electrodes 21B made of the second layer transparent electrode are separated pixel by pixel and each of them is connected to the thin film transistor 1B in the second row.

Therefore, the common electric potential line 15 shown in FIGS. 1 and 2 is no longer needed. Thus, an aperture ratio of the pixels can be increased to improve the quality of the display.

Figure 9A:
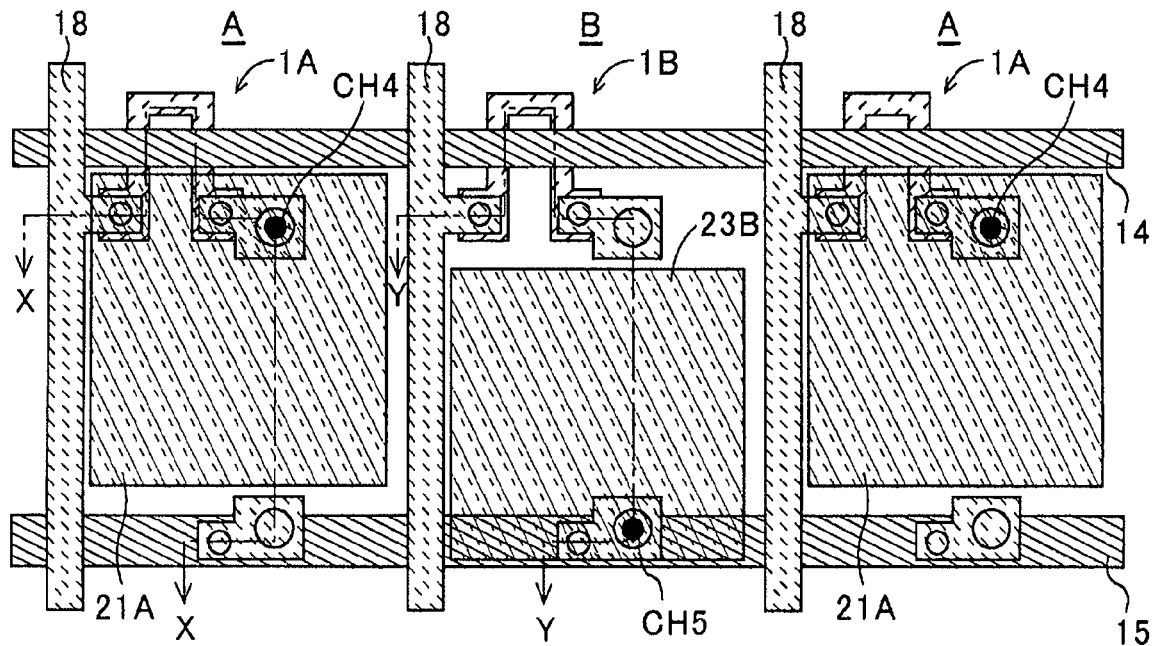
FIGS. 9A and 9B show layouts of pixels in a liquid crystal display device according to a third embodiment of this invention.
Figure 9B:
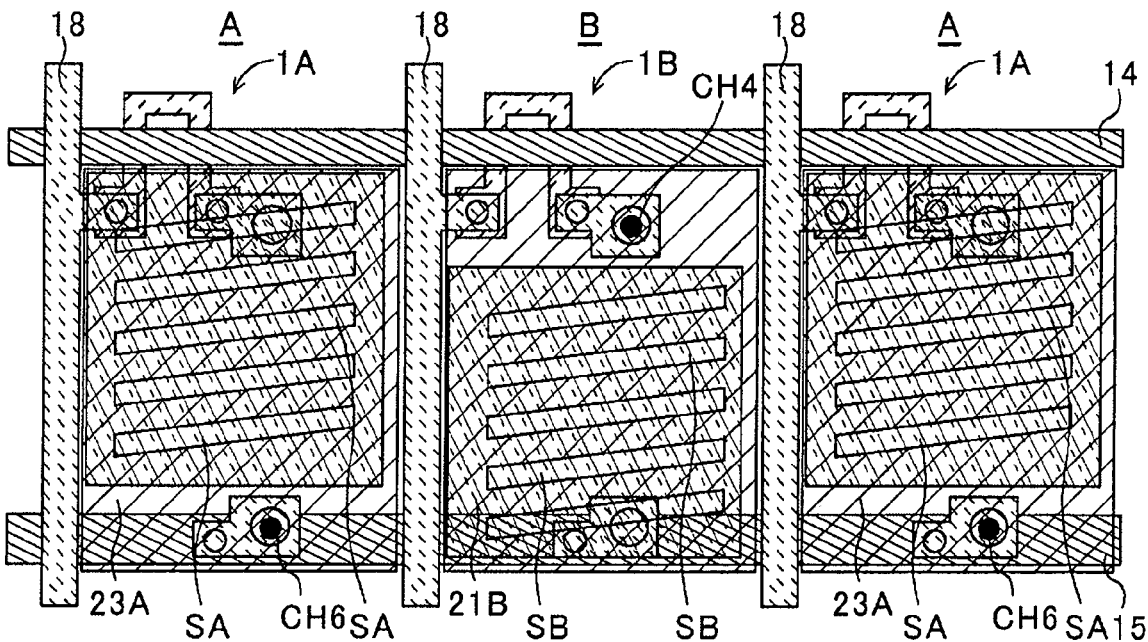

Next, a liquid crystal display device according to a third embodiment of this invention will be explained referring to the drawings. FIGS. 9A and 9B are layouts of pixels in the liquid crystal display device. FIG. 9A shows a layout of the first layer transparent electrode, while FIG. 9B shows, in addition to the layout of the first layer transparent electrode, a layout of the second layer transparent electrode disposed on the first layer transparent electrode through the insulation film.

Figure 10:
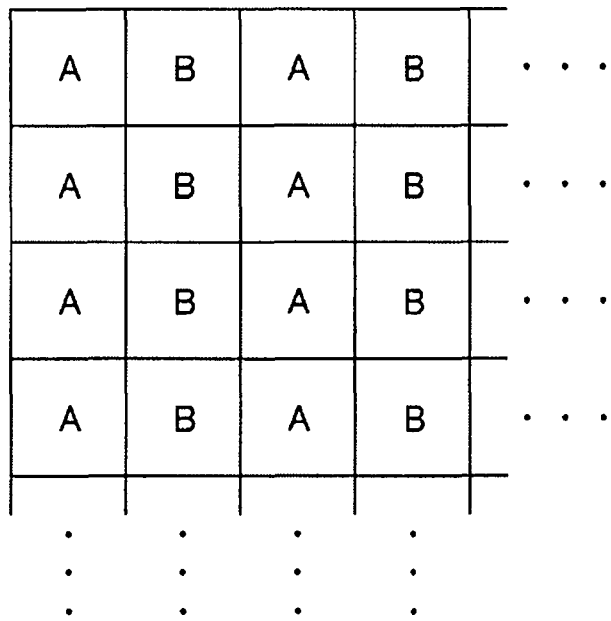
FIG. 10 shows a layout of a whole pixel region in the liquid crystal display device according to the third embodiment of this invention.
Figure 11A:
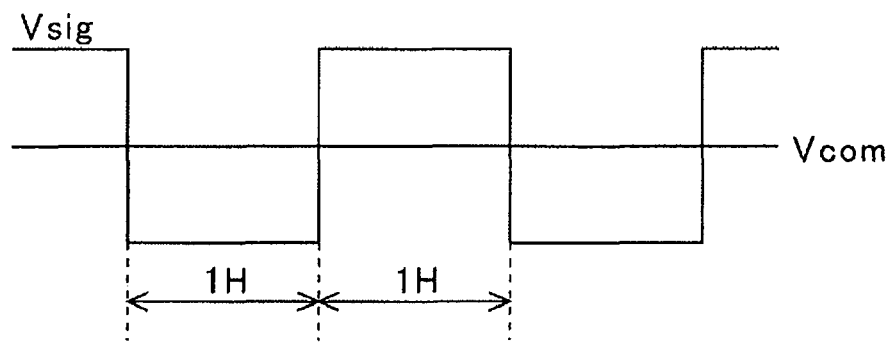
FIGS. 11A and 11B are for explanation of an inversion drive of a display signal Vsig according to the third embodiment of this invention.

As shown in FIG. 9A, the pixels A and the pixels B are disposed alternately in the left to right direction in each row. With the structure described above, a vertical position of the pixel electrode relative to that of the common electrode in the pixel A is reversed in the neighboring pixel B. FIG. 10 is a layout showing the whole pixel region in the liquid crystal display device. While the pixels A and the pixels B are disposed alternately in each of the rows, the same pixels A (or the same pixels B) are repeatedly disposed in the column direction (vertical direction). An operation in the case where the display signal Vsig of the line inversion drive as shown in FIG. 11A is applied to the liquid crystal display device of the layout described above will be explained. The polarity of the display signal Vsig relative to the common electric potential Vcom is inverted every horizontal period (1H), as shown in FIG. 11A.

The gate signal on the first line of the gate lines 14 shown in FIG. 10 turns to the high level to turn on the thin film transistors 1A and 1B in the pixels A and the pixels B. Provided that the thin film transistors 1A and 1B are of N-channel type, when the display signal Vsig of positive polarity is applied to the pixel electrode 21A through the thin film transistor 1A in the pixel A, the pixel electrode 21A of the lower layer becomes higher in the electric potential than the common electrode 23A of the upper layer. The pixel electrode 21B of the upper layer becomes higher in the electric potential than the common electrode 23B of the lower layer in the pixel B. Thus the direction of the electric field between the pixel electrode and the common electrode in the pixel A is reversed in the pixel B.

Figures 12, 13:
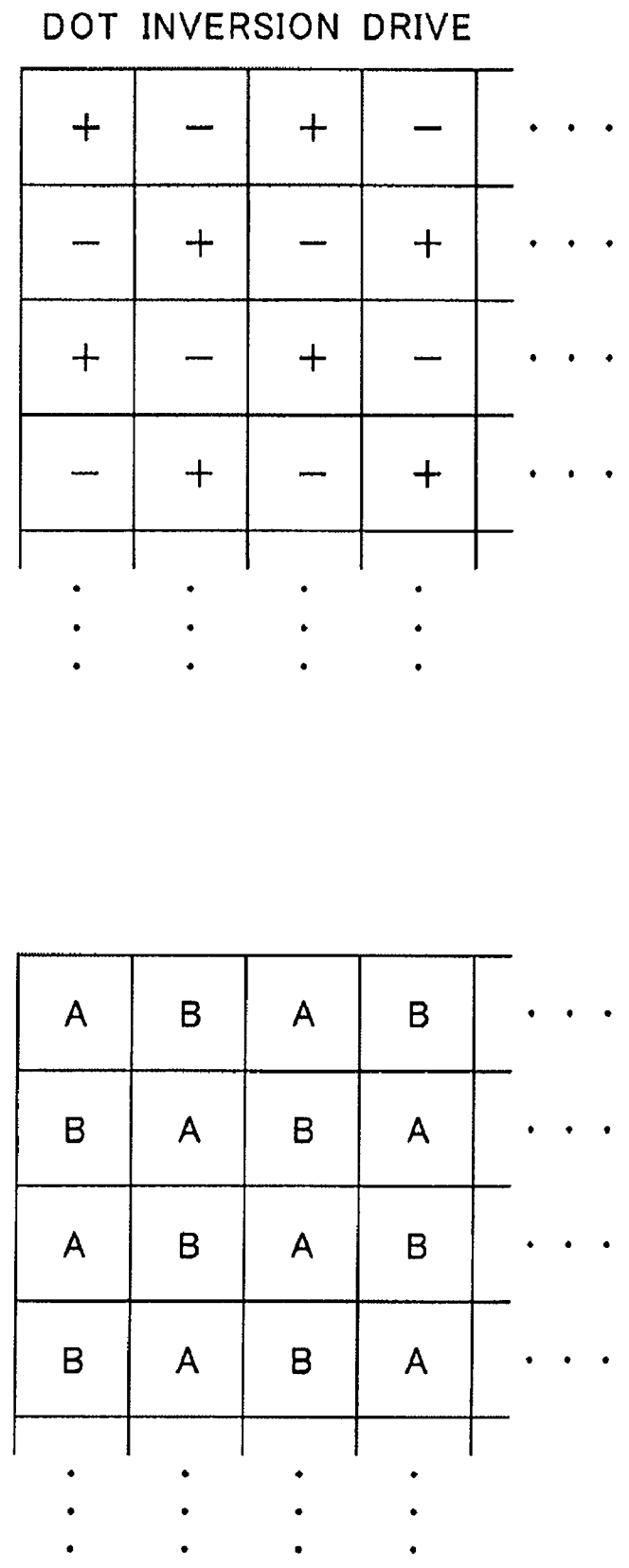

After the horizontal scanning on the first line is performed over one horizontal period (1H), the polarity of the display signal Vsig relative to the common electric potential Vcom is reversed and the horizontal scanning on the second row is performed. Although the relationship between the electric potential at the pixel electrode and the electric potential at the common electrode is reversed, it remains unchanged that the direction of the electric field between the pixel electrode and the common electrode in the pixel A is reversed in the pixel B. Performing the line inversion drive on each of the lines as described above results in performing the dot inversion drive as shown in FIG. 12. Symbols + and − shown in FIG. 12 denote a positive polarity (+) and a negative polarity (−) of the electric field applied to the liquid crystal, respectively.

Therefore, according to the liquid crystal display device described above, the dot inversion drive is performed in the pixel region by performing only the line inversion drive. With this, flickers can be suppressed, the structure of the peripheral circuit is simplified, and the power consumption is reduced.

Next, a liquid crystal display device according to a fourth embodiment of this invention will be explained. This embodiment is same as the first and second embodiments in that the pixels A and B are used. However, the arrangement of the pixels A and B is different. That is, the pixels A and B alternate in the left to right direction in each row and further alternate in the column direction (vertical direction) as well, as shown in FIG. 13. In other words, the pixels A and B are alternately disposed in the left to right direction in odd-numbered rows, and are alternately disposed in the left to right direction in the opposite order in even-numbered rows.

According to the structure described above, the dot inversion drive as shown in FIG. 12 can be performed without performing the line inversion drive. In this case, the display signal Vsig is inverted relative to the common electric potential Vcom once every vertical period (1V), as shown in FIG. 5A. According to this embodiment, the dot inversion drive is performed without performing the line inversion drive. Therefore, the structure of the peripheral circuit is even more simplified and the power consumption is reduced as well.

Next, a liquid crystal display device according to a fifth embodiment of this invention will be explained. While the thin film transistors 1A and 1B are low temperature polysilicon TFTs in the first through fourth embodiments, amorphous silicon TFTs (hereafter referred to as aSi-TFTs) are used instead of them in this embodiment. Although this embodiment is applied to the pixels disposed in the same way as in the third embodiment (Refer to FIGS. 9A and 9B.), it can be applied to the first, second and fourth embodiments as well.

Figure 14A:
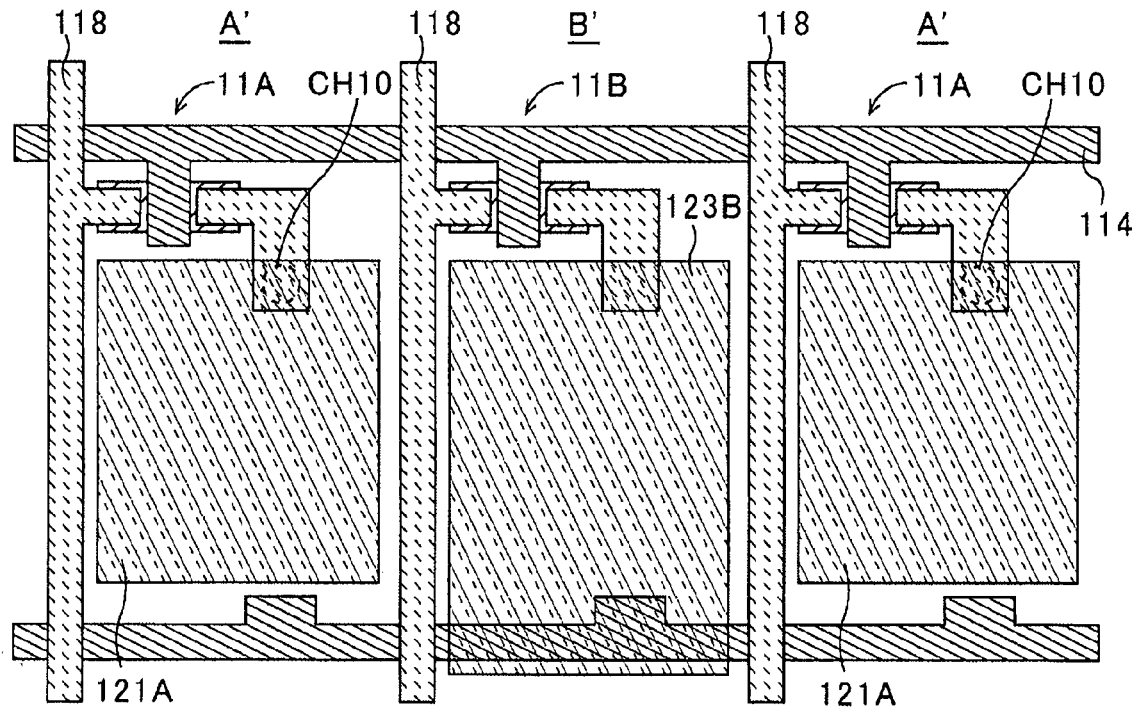
FIGS. 14A and 14B show layouts of pixels in a liquid crystal display device according to a fifth embodiment of this invention.
Figure 14B:
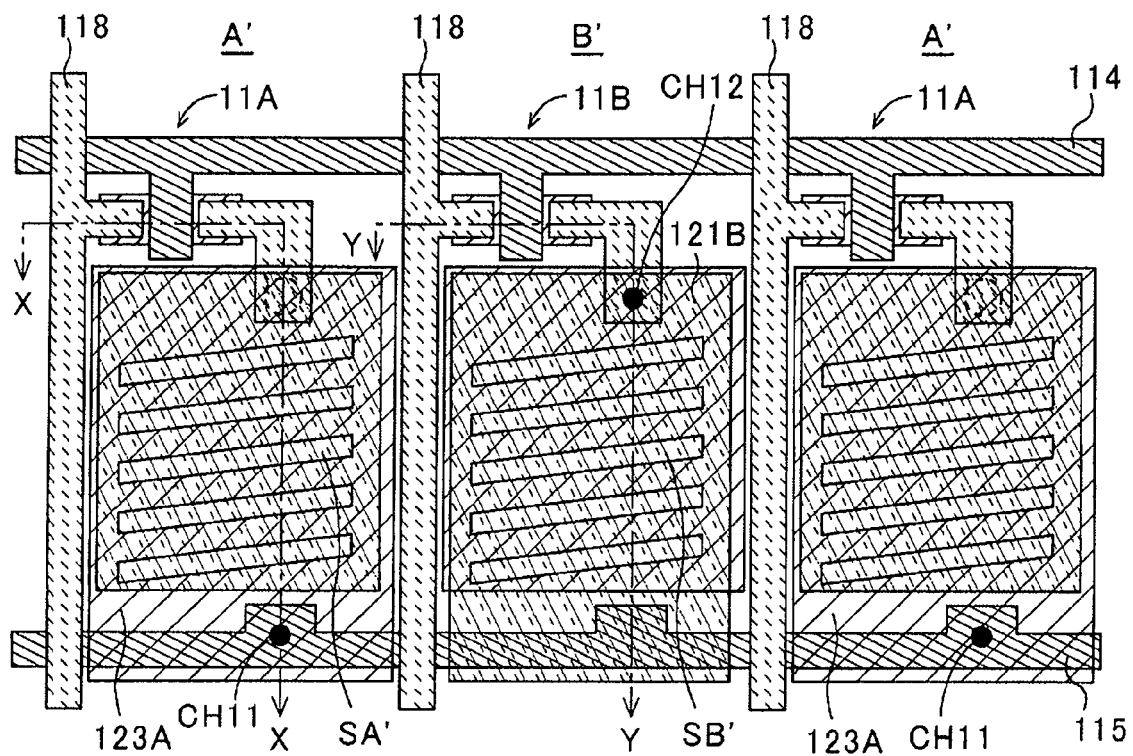

FIGS. 14A and 14B are layouts of the pixels in the liquid crystal display device. FIG. 14A shows a layout of the first layer transparent electrode, while FIG. 14B shows, in addition to the layout of the first layer transparent electrode, a layout of the second layer transparent electrode disposed on the first layer transparent electrode through the insulation film.

As shown in FIG. 14A, the pixels A' and the pixels B' are disposed alternately in the left to right direction in each row. In the pixel A', a pixel electrode 121A is formed of the first layer transparent electrode and connected with an aSi-TFT 11A through a contact hole CH10. In the pixel B', a common electrode 123B is formed of the first layer transparent electrode and overlaps with a common electric potential line 115 to be connected.

Also in the pixel A', a common electrode 123A having a plurality of slits SA' is formed of the second layer transparent electrode and connected with the common electric potential line 115 through a contact hole CH11, as shown in FIG. 14B. In the pixel B', a pixel electrode 121B having a plurality of slits SB' is formed of the second layer transparent electrode and connected with an aSi-TFT 11B through a contact hole CH12. With the structure described above, a vertical position of the pixel electrode relative to that of the common electrode in the pixel A' is reversed in the pixel B'.

A gate line 114 extending the left to right direction in one of the rows is a gate electrode common to the aSi-TFTs 11A and 11B. A plurality of display signal lines 118 is formed in the top to bottom direction intersecting the gate line 114, and each of the aSi-TFTs 11A and 11B is connected with corresponding each of the display signal lines 118, respectively.

Figure 15A:
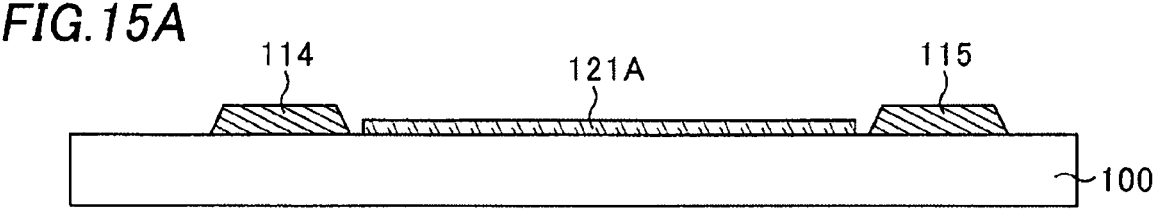
FIGS. 15A through 15E are for explanation of a structure and a manufacturing method of a pixel in the liquid crystal display device according to the fifth embodiment.

Next, a cross-sectional structure and a manufacturing method of the pixel A' will be explained referring to FIGS. 15A through 15E. First, the gate line 114 and the common electric potential line 115 made of chromium, molybdenum or the like are formed on a TFT substrate 100 made of glass substrate or the like, as shown in FIG. 15A. And the pixel electrode 121A made of the first layer transparent electrode is formed on the TFT substrate 100 between the gate line 114 and the common electric potential line 115.

Figure 15B:
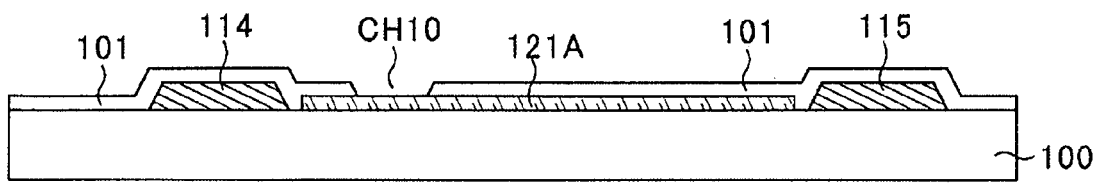

Next, a gate insulation film 101 is formed to cover the gate line 114 and the common electric potential line 115, as shown in FIG. 15B. The gate insulation film 101 on the pixel electrode 121A near the gate line 114 is selectively etched to form the contact hole CH10.

Figure 15C:
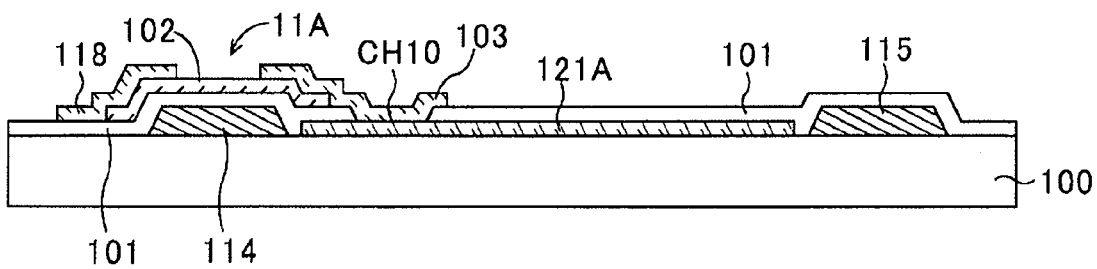

Next, an amorphous silicon layer 102 is formed to cover the gate line 114, as shown in FIG. 15C. The display signal line 118 (drain electrode) and a source electrode 103 made of aluminum or the like are formed in contact with the amorphous silicon layer 102. The source electrode 103 is connected with the pixel electrode 121A through the contact hole CH10.

Figure 15D:
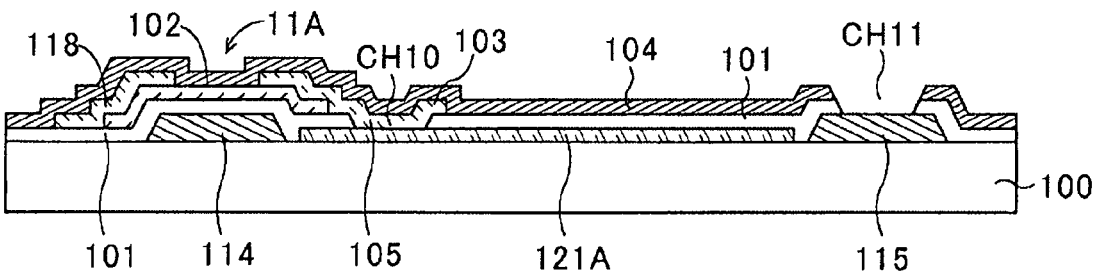
Figure 15E:
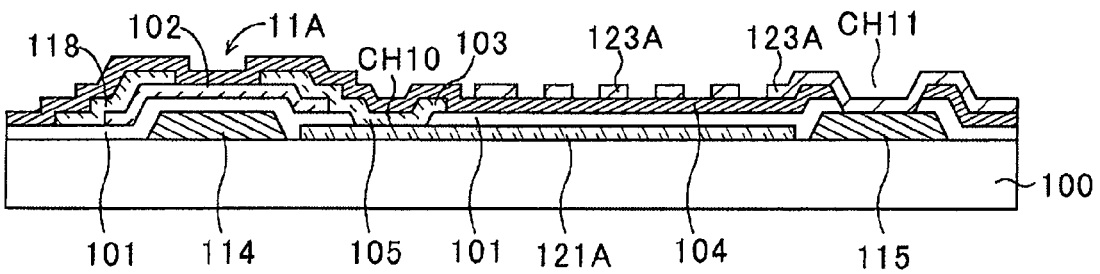

Next, an interlayer insulation film 104 is formed over the entire surface, as shown in FIG. 15D. The gate insulation film 101 and the interlayer insulation film 104 on the common electric potential line 115 are selectively etched to form the contact hole CH11. Next, the common electrode 123A, that is made of the second layer transparent electrode and connected with the common electric potential line 115 through the contact hole CH11, is formed as shown in FIG. 15E. The common electrode 123A is formed above the pixel electrode 121A, interposing the gate insulation film 101 and the interlayer insulation film 104 between them.

Figure 16A:
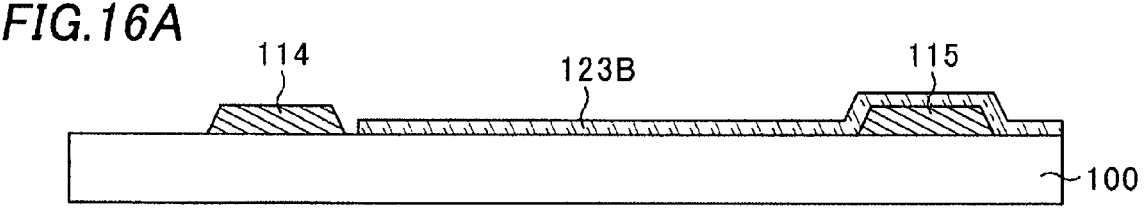
FIGS. 16A through 16E are for explanation of a structure and a manufacturing method of a pixel in the liquid crystal display device according to the fifth embodiment.

Next, a cross-sectional structure and a manufacturing method of the pixel B' will be explained referring to FIGS. 16A through 16E. First, the gate line 114 and the common electric potential line 115 are formed on the TFT substrate 100, as shown in FIG. 16A. And there is formed the common electrode 123B that covers the common electric potential line 115 and extends over a region between the gate line 114 and the common electric potential line 115. The common electrode 123B is connected to the common electric potential line 115 by making contact with it.

Figure 16B:
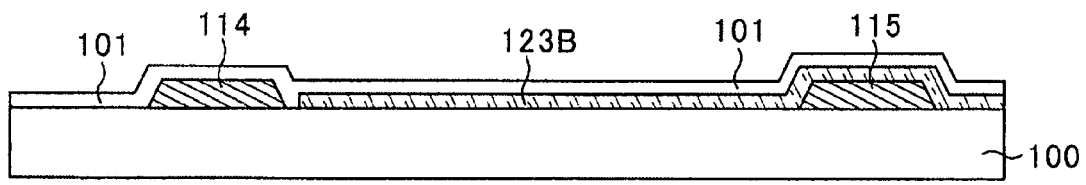
Figure 16C:
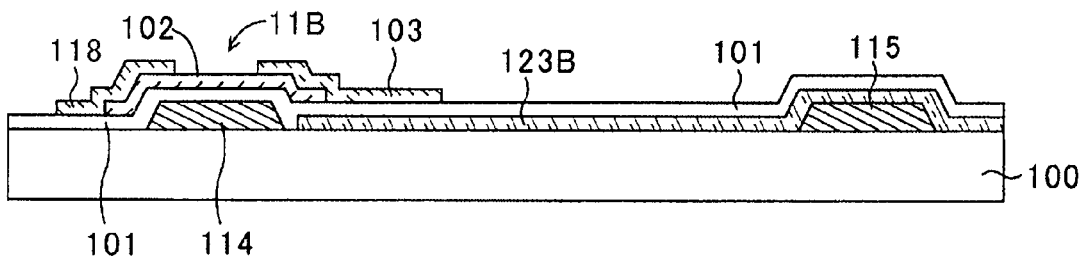

Next, the gate insulation film 101 is formed over the entire surface, as shown in FIG. 16B. Then, the amorphous silicon layer 102 is formed to cover the gate line 114, as shown in FIG. 16C. The display signal line 118 (drain electrode) and a source electrode 103 are formed in contact with the amorphous silicon layer 102.

Figure 16D:
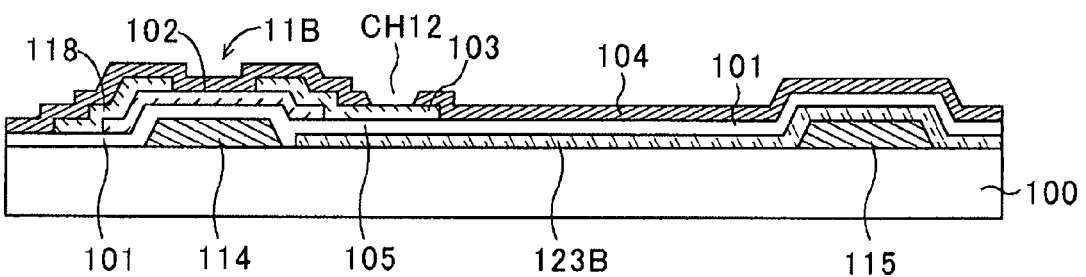
Figure 16E:
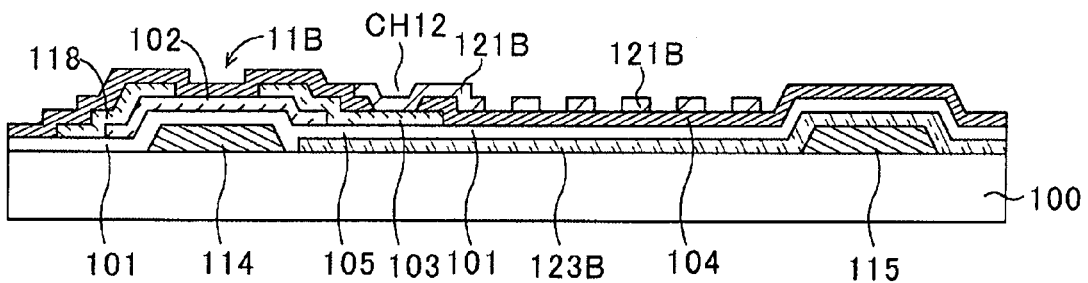
Figure 17A:
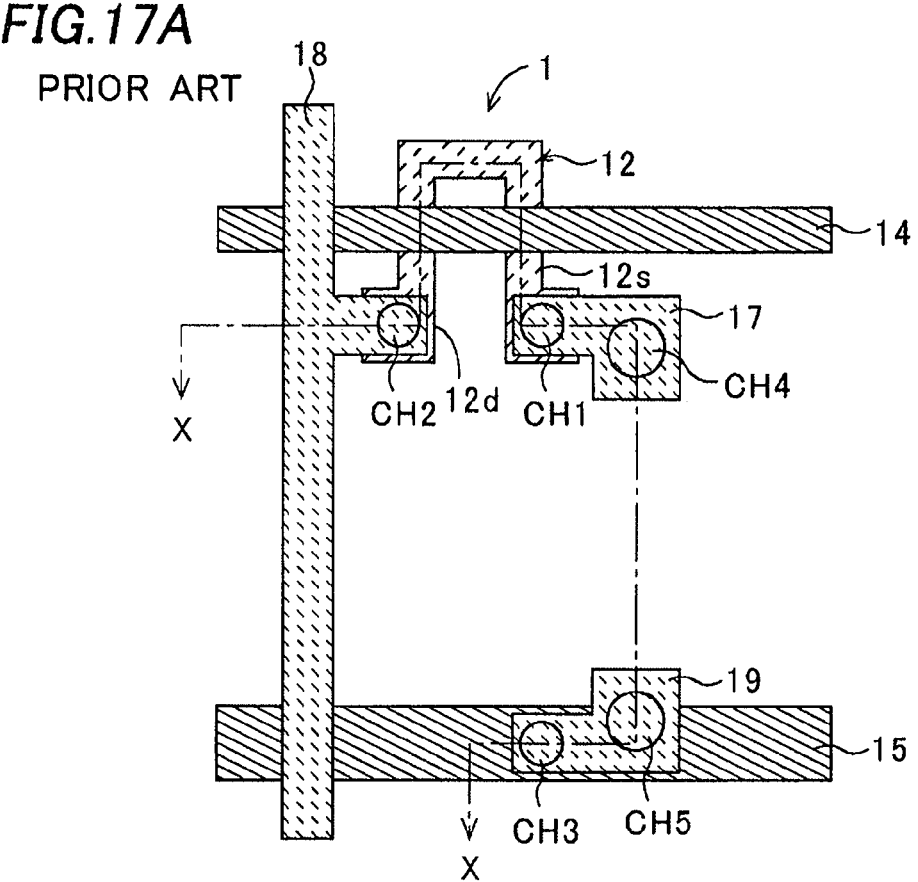
FIGS. 17A and 17B are for explanation of a structure and a manufacturing method of a liquid crystal display device according to a conventional art.
Figure 17B:
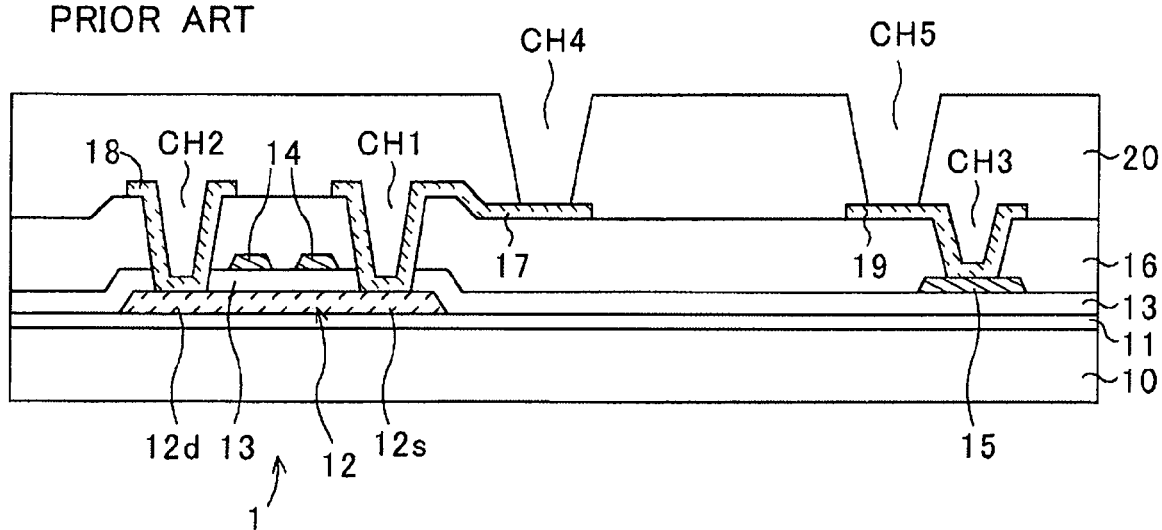
Figure 18A:
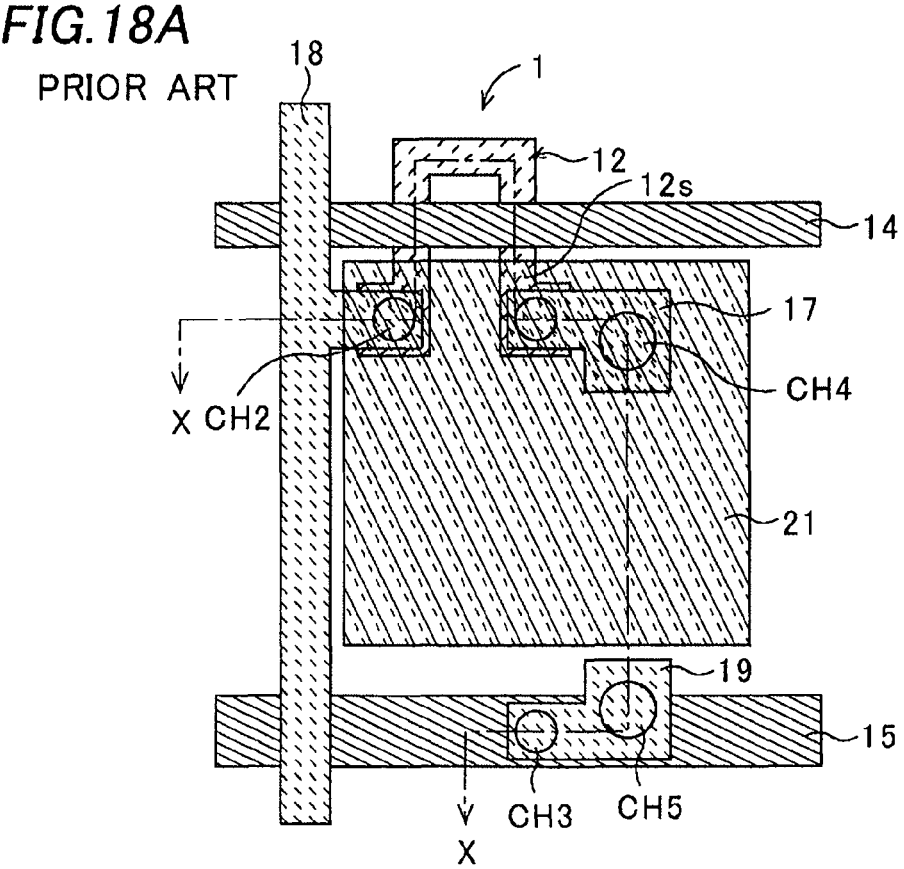
FIGS. 18A and 18B are for explanation of the structure and the manufacturing method of the liquid crystal display device according to the conventional art.
Figure 18B:
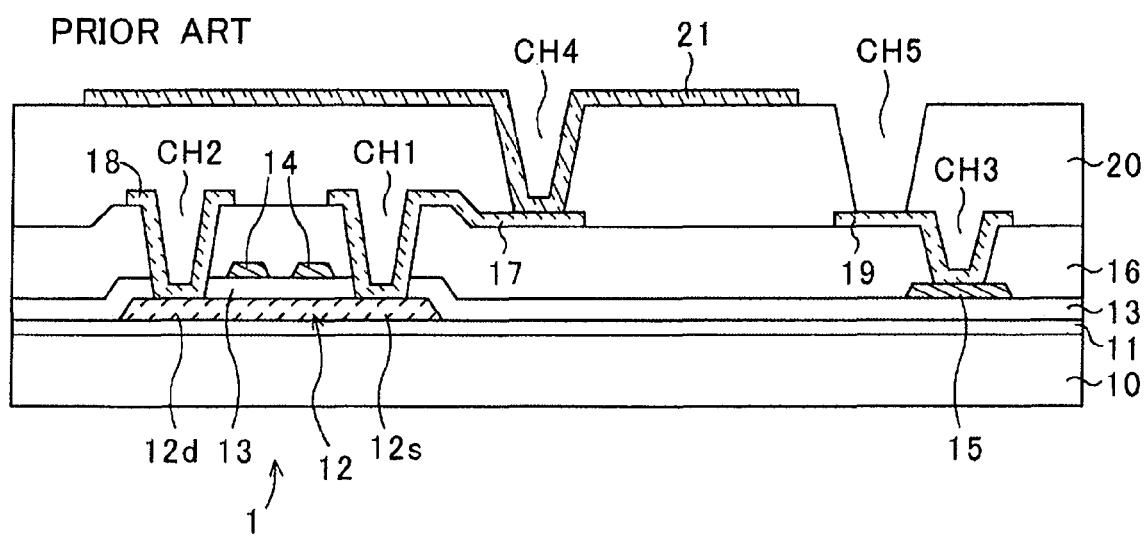

Next, the interlayer insulation film 104 is formed over the entire surface and the interlayer insulation film 104 on the source electrode 103 is selectively etched to form the contact hole CH12, as shown in FIG. 16D. Next, as shown in FIG. 16E, there is formed the pixel electrode 121B that is made of the second layer transparent electrode and connected with the source electrode 103 through the contact hole CH12. Contrary to the pixel A', the pixel electrode 121B is formed above the common electrode 123B, interposing the gate insulation film 101 and the interlayer insulation film 104 between them. Other features such as that the counter substrate is provided facing the TFT substrate 100 and the liquid crystal is sealed-in between the TFT substrate 100 and the counter substrate are same as in the first through fourth embodiments, and detailed explanations on them are omitted.

Figure 11B:
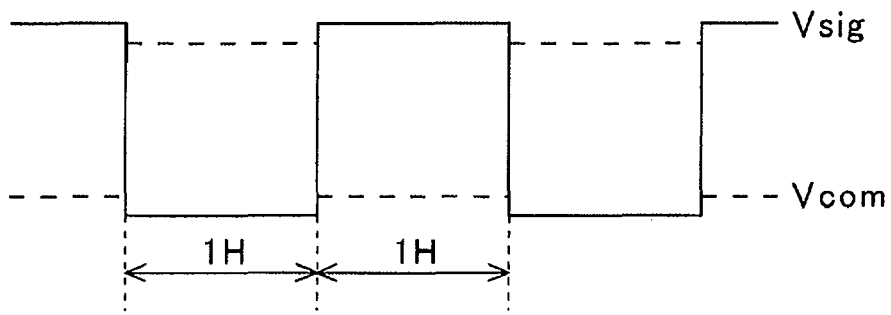

In order to further reduce the power consumption in the first and second embodiments, the common electrode AC drive, in which the common electric potential Vcom is inverted every vertical period (1V) as shown in FIG. 5B, may be used. In the third embodiment, the common electrode AC drive, in which the common electric potential Vcom is inverted every horizontal period (1H) as shown in FIG. 11B, may be used for further reduction of the power consumption. Also, in the fourth embodiment, the common electrode AC drive, in which the common electric potential Vcom is inverted every vertical period (1V) as shown in FIG. 5B, may be used for further reduction of the power consumption.

What is claimed is:

1. A liquid crystal display device comprising:
   a first substrate;
   a plurality of first pixels disposed on the first substrate, each of the first pixels comprising a first pixel electrode disposed on the first substrate and a first common electrode having a plurality of first slits formed therein and disposed on the first pixel electrode;
   a plurality of second pixels disposed on the first substrate, each of the second pixels comprising a second common electrode disposed on the first substrate and a second pixel electrode having a plurality of second slits formed therein and disposed on the second common electrode;
   a second substrate disposed on the first substrate so as to face the first and second pixels; and
   a liquid crystal sealed-in between the first substrate and the second substrate,
   wherein the first and second pixels form a matrix comprising rows and columns so that the first pixel and the second pixel alternate in each row and in each column.

2. The liquid crystal display device of claim 1, wherein the first pixel electrodes and the second common electrodes are part of a first transparent electrode layer formed on the first substrate and the second pixel electrodes and the first common electrodes are part of a second transparent electrode layer formed on the first transport electrode layer.

3. The liquid crystal display device of claim 1, wherein the matrix is configured to be scanned in a horizontal direction along a row and to be scanned in a vertical direction along a column as a series of scanning in the horizontal direction, and
   the first and second pixel electrodes are configured to receive display signals that are inverted relative to a common electric potential every period of the scanning in the vertical direction.

4. The liquid crystal display device of claim 1, wherein the matrix is configured to be scanned in a horizontal direction along a row and to be scanned in a vertical direction along a column as a series of scanning in the horizontal direction, and
   the first and second common electrodes are configured to receive a common electric potential, a polarity of the common electric potential being inverted every period of the scanning in the vertical direction.

5. The liquid crystal display device of claim 1, wherein each of the first pixels comprises a first thin film transistor connected with a corresponding first pixel electrode, and each of the second pixels comprises a second thin film transistor connected with a corresponding second pixel electrode.

6. The liquid crystal display device of claim 5, wherein the first and second thin film transistors are made of polysilicon or amorphous silicon.

* * * * *